June 20, 1961 J. F. JOHNSON ET AL 2,988,827
VACUUM FRAMING APPARATUS
Filed June 3, 1959

INVENTORS
J. F. Johnson
R. B. Robinson

United States Patent Office 2,988,827
Patented June 20, 1961

2,988,827
VACUUM FRAMING APPARATUS
James F. Johnson and Robert B. Robinson, Tulsa, Okla., assignors to Sinclair Oil & Gas Company, Tulsa, Okla., a corporation of Maine
Filed June 3, 1959, Ser. No. 817,878
7 Claims. (Cl. 35—41)

This invention relates to geophysical exploration of the subsurface of the earth. More particularly, it relates to the construction and employment of models of subsurface regions of the earth.

It is known to use multi-layered models as representations of the earth's geologic layers and, more specifically, to employ one or more of the model's multiple, usually paper layers as representations of the earth's aquifers, i.e., water-bearing beds or strata of earth, gravel or porous stone, with the resistivity of the individual layer being proportioned to the impermeability of the aquifer it represents. Then, further to stimulate both lateral and vertical flow of aquifer fluids, these layers are accordingly electrically energized.

Heretofore, in hydrodynamics basin modeling, the electrically conductive mats, i.e., layers of the multiple layered electrical analog models, have been cemented together with electrically conductive adhesive. However, the use of electrically conductive cement presents a number of problems. First, the resistivity of the cement itself introduces distortions in the model's representation. Then, since it is necessary to measure voltages in all layers of the model during a study and, therefore, to probe all layers, it is necessary to cut, drill or punch small holes in the model in order to insert probes. But such small holes allow little freedom of movement for the probes and, therefore, study of an individual layer is limited. Again, it often occurs, in considering a geologic situation, that voltage values are measured in a cemented model which do not fit known formation pressures and, therefore, it becomes necessary to vary the electrical conductivity of the model's aquifer layers according to reasonable geologic hypotheses. But, since to obtain such variations in electrical conductivity usually involves the use of other materials to represent the aquifer layers in question and since the cement prohibits the introduction of such other materials, it becomes necessary to rebuild the model completely. This too is clearly disadvantageous.

It is an object of this invention, therefore, to construct a multiple layered electrical analog model in which the mats representing geologic layers are not cemented together. This avoidance of cement in making the model facilitates free movement of voltage probes within the model; makes possible its ready assembly, disassembly and reassembly; and, makes possible the modification of individual mats so as to afford an accurate representation of the portion of the earth's structure under examination.

Broadly, this invention involves the employment of a vacuum framing apparatus, instead of glue, cement or the like, to hold together the mats of a multiple layered electrical analog model when such mats are under study. The vacuum framing apparatus includes a box having an open upper end defined by the upper edges of the side portions of the box, a flexible closure sheet resting on the upper edges of the side portions and positioned across the open upper end of the box, a flat support for the mats positioned within the box and having its upper surface facing the open upper end of the box, and an air outlet positioned in the box. The air outlet, of course, provides the means for connecting the box to an air evacuating suction.

Thus, uncemented mats of the multiple layered electrical analog model are laid flatly in a shallow, airtight box and, preferably on the upper surface of a flat support which is a perforated platform upraised from the bottom of the box. All side portions of the box are substantially rigid and provide the upper edges on which the flexible closure sheet which covers the open upper end of the box rests. Then, when the vacuum pump which is connected to the air outlet in the box, preferably at its base, begins to evacuate the box, the flexible closure sheet is depressed into the box and against the upper mat layer therein by the outside atmospheric pressure, so as to compress the mat layers between the sheet and the support face on which they rest. In a preferred form of the apparatus of this invention, the flexible closure sheet can be held against the upper edges of the side portions of the box by external weights, so as to prevent the slipping of the sheet and the breaking of the vacuum within the box by such slippage.

For a better understanding of the invention, reference should be had to the attached drawings of one embodiment of such invention in which FIGURE 1 is an isometric view of the apparatus of this invention;

FIGURES 1 to 4 show a rectangular box 10 having four sides 11, 12, 13 and 14 and a bottom 15. This box, i.e., vacuum frame, can be made to any necessary width or length, but, usually, it needs to be only two to ten inches in depth. The sides can, for instance, be constructed of 1" x 8" boards and the bottom of ¾" plywood.

Figure 1:
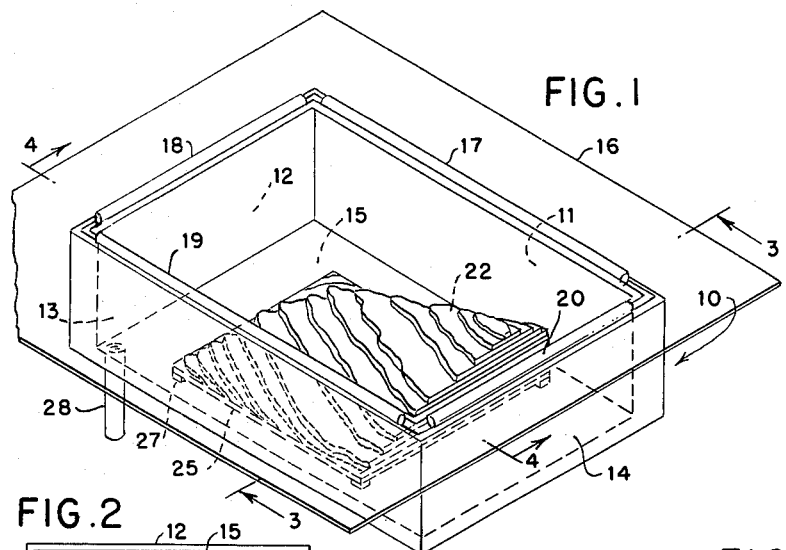
Figure 2:
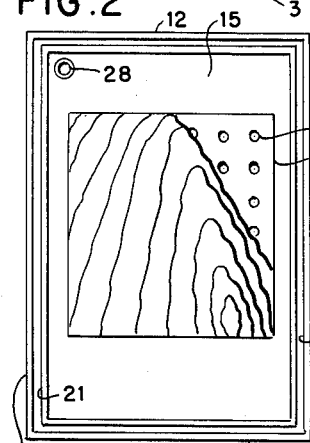
FIGURE 2 is a plan view of the apparatus of this invention.
Figure 3:
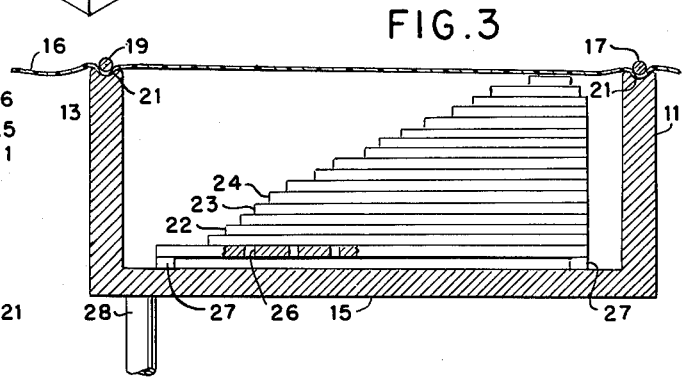
FIGURE 3 is a vertical section of the apparatus of FIGURE 1 along line 3—3; and, FIGURE 4 is a vertical section of the apparatus of FIGURE 1 along line 4—4.
Figure 4:
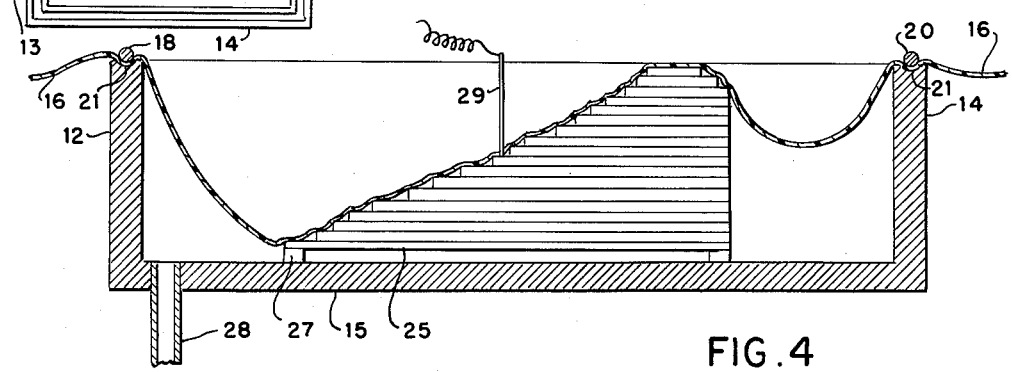

FIGURES 1, 3 and 4 show a flexible closure membrane 16 forming the top of box 10. The flexible closure membrane can be a thin sheet of polyethylene or rubber or the like and, is, preferably, transparent. Also shown are rods 17, 18, 19 and 20 which rest on the upper edges of sides 11, 12, 13 and 14, respectively, weighing down closure membrane 16 and preventing its slippage. These rods can be of brass or the like and can be made to rest in groove 21 which is positioned along the upper edges of sides 11, 12, 13 and 14 in the preferred embodiment of this invention comprehended by the attached drawings.

As shown in FIGURES 1 to 4, multiple layer electrical analog model 22 is constructed of numerous layers, e.g., 23 and 24. These layers, i.e., mats, are usually of paper or paperboard and each mat layer has a resistance to electrical current corresponding to the impermeability of the geological layer, i.e., aquifer, it represents. The model 22 rests in box 10 on manifold platform 25 which has perforations, i.e., holes 26, and, in turn, rests on spacers 27 resting on box bottom 15. The perforations and spacers of platform 25 operate to aid in the uniform evacuation of box 10 by the vacuum pump (not shown) which is connected to exhaust pipe 28. Not shown in FIGURES 1 to 4 are an external voltage divider, a power supply, and pressure sealed electrical connectors mounted on box 10 which permit, by means of fine wires, the application to each mat layer of model 22 representing an aquifer of a voltage corresponding to the elevation of such aquifer outcropping in the area, e.g., hydrodynamic basin, being modeled. The fine wires can be attached to the layers of the model with silver paint and tape.

As shown in FIGURE 4, a probe 29 for reading the voltages present in the various mat layers is inserted into model 22, through flexible closure membrane 16. The end of the probe, which can be a piece of enameled wire having 1/20" of its lower end scraped free of enamel, is either driven through the membrane 16 and into one of the layers or it is passed through a U-shaped slit in the membrane and moved along between the several layers of the model. Another type of probe is a small brass disc soldered to an insulated wire which can be moved through the model.

In operation, the multiple layer electrical analog model apparatus is subjected to a vacuum of from about 3 to 5 inches of mercury. A preferred instrument for achieving this vacuum is an ordinary household vacuum cleaner which, while it does not achieve high degrees of evacuation, moves sufficient quantities of air to make the device operate effectively. The vacuum produced in box 10 by means of pipe 28 causes flexible membrane 16 to press down upon the upper layer of the mats of model 22, as is illustrated in FIGURE 4, and, thereby, to give rise to pressures on all the mats and the manifold platform 25. These mat pressures are, of course, analogous to the natural pressures extant in the geological area being modeled and the effect of such mat pressures on the voltages present in the various mat layers is analogous to the effect of such natural pressures on the liquid pressures in the aquifers under study. Consequently, a reading of the resultant voltages present in, for example, mats 23 and 24 by means of probe 29, while the vacuum is being applied permits a determination of the liquid pressure in the geological area.

Although this vacuum frame apparatus was developed specifically for multiple layered electrical analog models, it can be useful in any situation where it is necessary to hold sheets of material in contact and, at the same time, to provide access to such sheets. Hence, it is useful in blueprinting work as well.

What is claimed is:

1. In combination with the electrically conductive mats of a multiple layered electrical analog model, a vacuum framing apparatus including a box having side portions and having an open upper end defined by the upper edges of the side portions of the box, a flexible closure sheet resting on the upper edges of the side portions and positioned across the open upper end of the box, a flat support for the mats positioned within the box and having its upper surface facing the open upper end of the box, and an air outlet positioned in the box.

2. In combination with the electrically conductive mats of a multiple layered electrical analog model, a vacuum framing apparatus including a box having side portions and a bottom and having an open upper end defined by the upper edges of the side portions of the box, a flexible closure sheet resting on the upper edges of the side portions and positioned across the open upper end of the box, a flat platform for the mats positioned within the box and upraised from its bottom by spacers and having its upper surface facing the open upper end of the box, and an air outlet positioned in the box.

3. The apparatus of claim 2 in which the platform is perforated.

4. In combination with the electrically conductive mats of a multiple layered electrical analog model, a vacuum framing apparatus including a box having side portions and having an open upper end defined by the upper edges of the side portions of the box, a flexible closure sheet resting on the upper edges of the side portions and positioned across the open upper end of the box, a flexible closure sheet weighting means positioned along the upper edges of the side portions of the box, a flat support for the mats positioned within the box and having its upper surface facing the open upper end of the box, and an air outlet positioned in the box.

5. A vacuum framing apparatus for use with the electrically conductive mats of a multiple layered electrical analog model comprising a box having four sides and a bottom and having an open upper end defined by the upper edges of the sides, a flexible closure sheet resting on the upper edges of the sides of the box, grooves along the upper edges of the sides of the box, rods resting on the flexible closure sheet in the grooves along the upper edges of the sides of the box, a flat perforated platform for the mats positioned within the box and upraised from its bottom by spacers and having its upper surface facing the open upper end of the box, and an air outlet positioned in the bottom of the box.

6. The apparatus of claim 1 in which the air outlet positioned in the box is connected to an air evacuating means.

7. A vacuum framing apparatus for holding multilayered sheets of material in contact, comprising a box having side portions, a bottom and having an open upper end defined by the upper edges of the side portions of the box, a flexible closure sheet resting on the upper edges of the side portions and positioned across the open upper end of the box, a flat support for the multilayered sheets of material positioned within the box and having its upper surface facing the open upper end of the box, and an air outlet positioned in the box and connected to an air evacuating means.

References Cited in the file of this patent

UNITED STATES PATENTS

| 2,128,690 | Burke et al. | Aug. 30, 1938 |
| 2,876,562 | Stieber | Mar. 10, 1959 |

FOREIGN PATENTS

| 30,180 | Germany | July 5, 1884 |